May 26, 1931.  M. SOLOMON  1,807,180
CAP
Filed Oct. 22, 1929
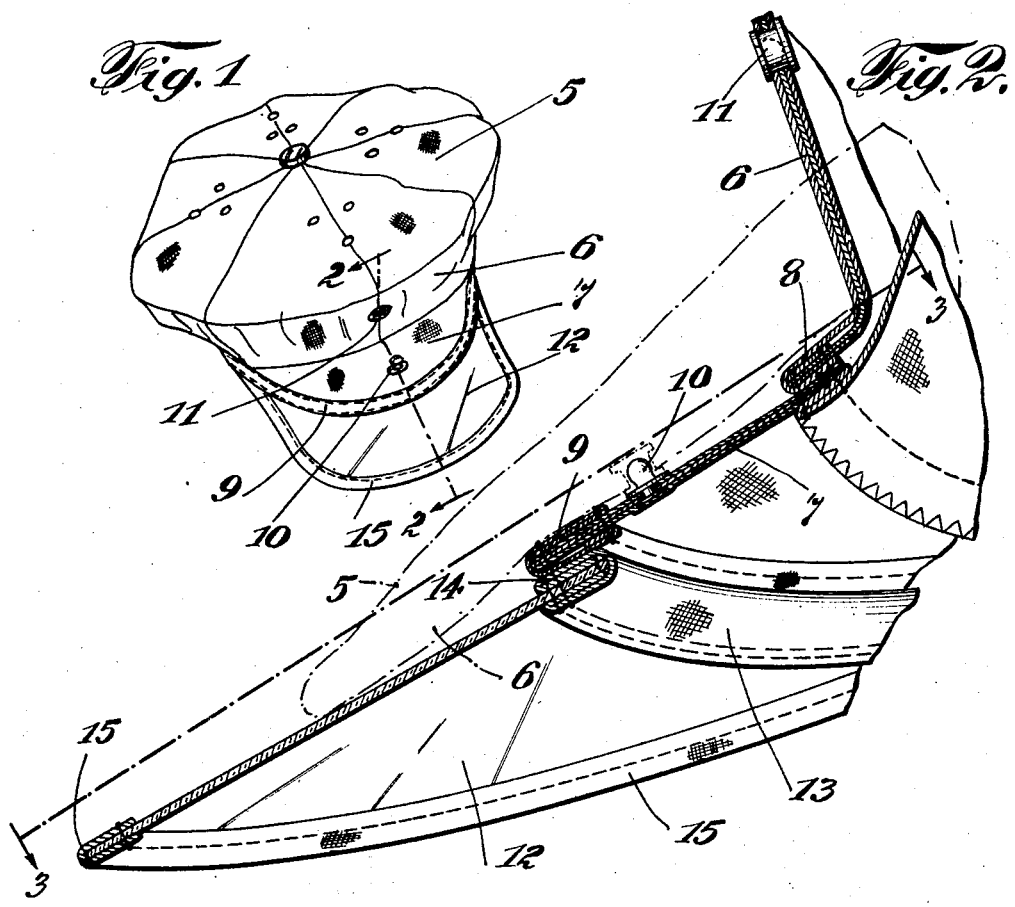
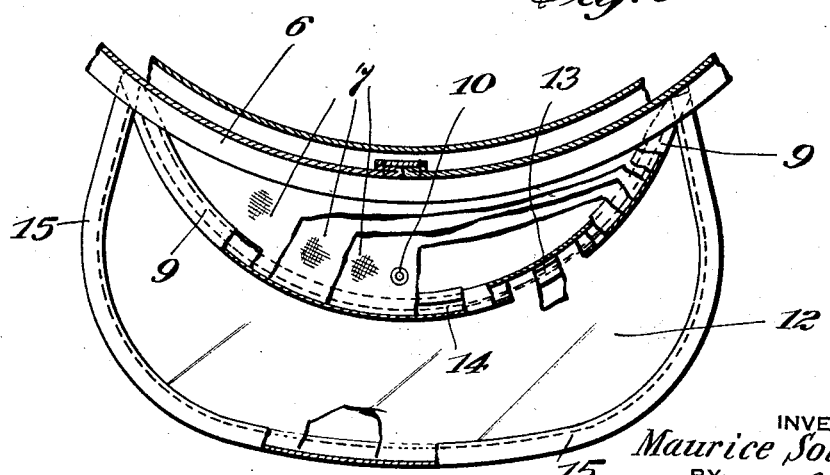
INVENTOR
Maurice Solomon
BY C. P. Goepel
his ATTORNEY Patented May 26, 1931

1,807,180

UNITED STATES PATENT OFFICE

MAURICE SOLOMON, OF YONKERS, NEW YORK

CAP

Application filed October 22, 1929. Serial No. 401,426.

This invention relates to caps, and has for its primary object to provide an improved cap constructed essentially from cloth or other flexible material and provided with a visor of celluloid or other translucent material.

My present improvements, as adapted to a cap of the above type, may be briefly described as embodying a relatively short rear crescent shaped visor section composed of a plurality of laminations of cloth or other opaque material and stitched or otherwise secured along its rear edge to the lower edge of the rim portion of the cloth crown of the cap. This visor section carries the stud element fastener, the socket element of which is attached to the front of the round rim so that by the connection of these fastener elements, the front portion of the top or crown of the cap may be detachably secured in close superimposed relation upon the visor. The essential feature of my invention consists in a front crescent shaped visor section of suitably colored semi-opaque or translucent celluloid or like material attached at its rear edge to the front edge of the rear opaque visor section.

It is a further general object of my invention to provide an improved cloth cap as above characterized, the several parts of which are similar in construction, and may be readily assembled and secured together whereby the manufacturing and selling cost of such caps provided with the improved visor will not be appreciably greater than the ordinary cap of this kind.

With the above and other objects in view, the invention consists in the improved cap and in the form, construction and relative arrangement of its several parts as will be hereinafter more fully described, illustrated in the accompanying drawings, and subsequently incorporated in the subjoined claim.

In the drawings, wherein I have shown one simple and practical embodiment of the invention, and in which similar reference characters designate corresponding parts throughout the several views,—

Figure 1 is a perspective view showing my new cap;

Fig. 2 is an enlarged fragmentary sectional view taken on the line 2—2 of Fig. 1, and Fig. 3 is a sectional plan view as indicated by the line 3—3 in Fig. 2, certain of the parts being broken away.

As clearly shown in Fig. 1 of the drawings, the cap is provided with the usual top or crown portion 5 having a rim portion 6 and suitably constructed from a plurality of plies of canvas or other flexible fabric material.

At the front of the rim portion 6 of the cap, a comparatively narrow forwardly projecting visor section 7 is secured to the lower edge of the rim 6, as indicated by the stitching 8 in Fig. 2 of the drawings. This visor section which is of general crescent shaped form may also be composed of a plurality of plies of fabric or other opaque material, the free or unattached edges of which are secured together by a binding strip indicated at 9. This visor section 7 has the stud element 10 of a fastening device suitably secured thereto. The complementary socket element 11 of said device is attached to the front of the rim portion 6 of the cap crown so that the front of said rim and the front portion of the top of the cap crown may be folded down over and upon the visor section 7 and held in close superimposed relation thereto by the connection of the fastening elements 10 and 11 with each other.

The front visor section 12 consists of a sheet of suitably colored celluloid or other semi-opaque or translucent material, the area of which is considerably greater than the area of the opaque visor section 7. A cloth binding strip 13 is secured to the rear curved edge of the celluloid visor section 12 and underlies the binding strip 9 of the visor section 7, the two binding strips together with the visor sections 7 and 12 being securely fixed to each other by the stitching indicated at 14. A cloth binding strip 15 is also secured to the outer and side edges of the celluloid visor 12 and may be of the same color as the cap body or crown to give an attractive finish to the visor.

From reference to Fig. 2 of the drawings, it will be noted that when the front portion of the cap body is fastened to the rear visor section 7 by the fastener elements 10 and 11, it will extend over the binder strip 9 and the connected edges of the two visor sections and upon the upper surface of the translucent visor section 12 as clearly shown in dotted lines. However, an appreciable portion of this translucent visor section 12 extends forwardly beyond the folded front part of the cap crown, and therefore, provides a desired shade to the eyes of the wearer.

From the above description considered in connection with the accompanying drawings, the construction and several advantages of my new cap will be clearly understood. It will be seen that I have succeeded in providing such a cloth hat with a translucent visor, and still provided for the folding of the front portion of the cap crown and its attachment to the visor in the manner of the ordinary cloth cap of this type. The several parts above described may be readily cut out by means of suitable dies and rapidly assembled and secured together so that the new cap may be produced at comparatively low manufacturing cost.

While I have herein shown and described a practical and satisfactory embodiment of my present improvements, it will nevertheless be understood that the essential features thereof may also be incorporated in various other alternative structures, and I accordingly reserve the privilege of resorting to all such legitimate changes therein as may be fairly embodied within the spirit and scope of the invention as claimed.

I claim:

A cap comprising a crown and rim of flexible cloth material, a visor section secured to the front lower edge of the rim and projecting forwardly therefrom, said visor section being relatively rigid and embodying a plurality of opaque cloth laminations, a second visor section of translucent material and of greater area than said first visor section permanently and fixedly secured at its rear edge to the forward edge of the first visor section, said first visor section and the cap rim having coacting fastener elements secured thereto, said rim adapted to be folded downwardly upon said visor section to connect said fastener elements and extending forwardly beyond the front edge thereof and upon the transparent visor section to partially cover the latter.

In testimony that I claim the foregoing as my invention, I have signed my name hereto.

MAURICE SOLOMON.